United States Patent [19]

Lijewski et al.

[11] 4,452,103

[45] Jun. 5, 1984

[54] TWIN CAM INDEX DRIVE

[75] Inventors: Michael E. Lijewski, Westland; George Zeissler, Sterling Heights, both of Mich.

[73] Assignee: Expert Automation, Inc., Sterling Heights, Mich.

[21] Appl. No.: 328,066

[22] Filed: Dec. 7, 1981

[51] Int. Cl.³ ............................ B23B 29/24; B23Q 17/00
[52] U.S. Cl. ............................................. 74/817; 74/821; 74/57; 74/567
[58] Field of Search ............... 74/567, 569, 817, 821, 74/426, 57, 58, 84 R

[56] References Cited

U.S. PATENT DOCUMENTS

| | | | |
|---|---|---|---|
| 1,228,496 | 6/1917 | Turner | 74/57 X |
| 2,440,674 | 5/1948 | Bell | 74/58 |
| 2,852,960 | 9/1958 | Brems | 74/821 |
| 2,857,787 | 10/1958 | Natalis | 74/821 |
| 3,025,709 | 3/1962 | Brems | 74/89.17 |
| 3,029,652 | 4/1962 | Brems | 74/89.16 |
| 3,818,770 | 6/1974 | Sievers | 74/57 |
| 4,031,764 | 6/1977 | Curtis | 74/57 |

OTHER PUBLICATIONS

Expert Automation brochure Entitled "Reciprocating Shuttle Drives".
Motion Manufacturing Inc. Precision Index Drives for Rotary Motions Precision Turntable of the E22 Series.

Primary Examiner—Leslie A. Braun
Assistant Examiner—Frank McKenzie
Attorney, Agent, or Firm—Harness, Dickey & Pierce

[57] ABSTRACT

An improved dual cam indexing drive assembly (10) is disclosed which is well suited for use in driving various types of rotational, linear, and/or reciprocating work transfer apparatus (12). The drive system (10) utilizes primary and secondary rotatable cams (32, 34) supported on and driven by a common shaft (36) coupled to a power source (24) via suitable gear reduction (30), clutch and/or brake means. Aligned primary and secondary cam followers (54, 56, 58 and 64, 66, 68) are provided on the moving transfer apparatus (14), the primary cam followers (54, 56, 58) being designed to operatively engage cam grooves (46, 48) provided on both primary and secondary cams (32, 34) whereas the secondary cam followers (64, 66, 68) cooperate only with cam grooves (48, 50, 52) provided on the secondary cam (34) to drive the work transfer apparatus (12) between successive work stations.

21 Claims, 9 Drawing Figures

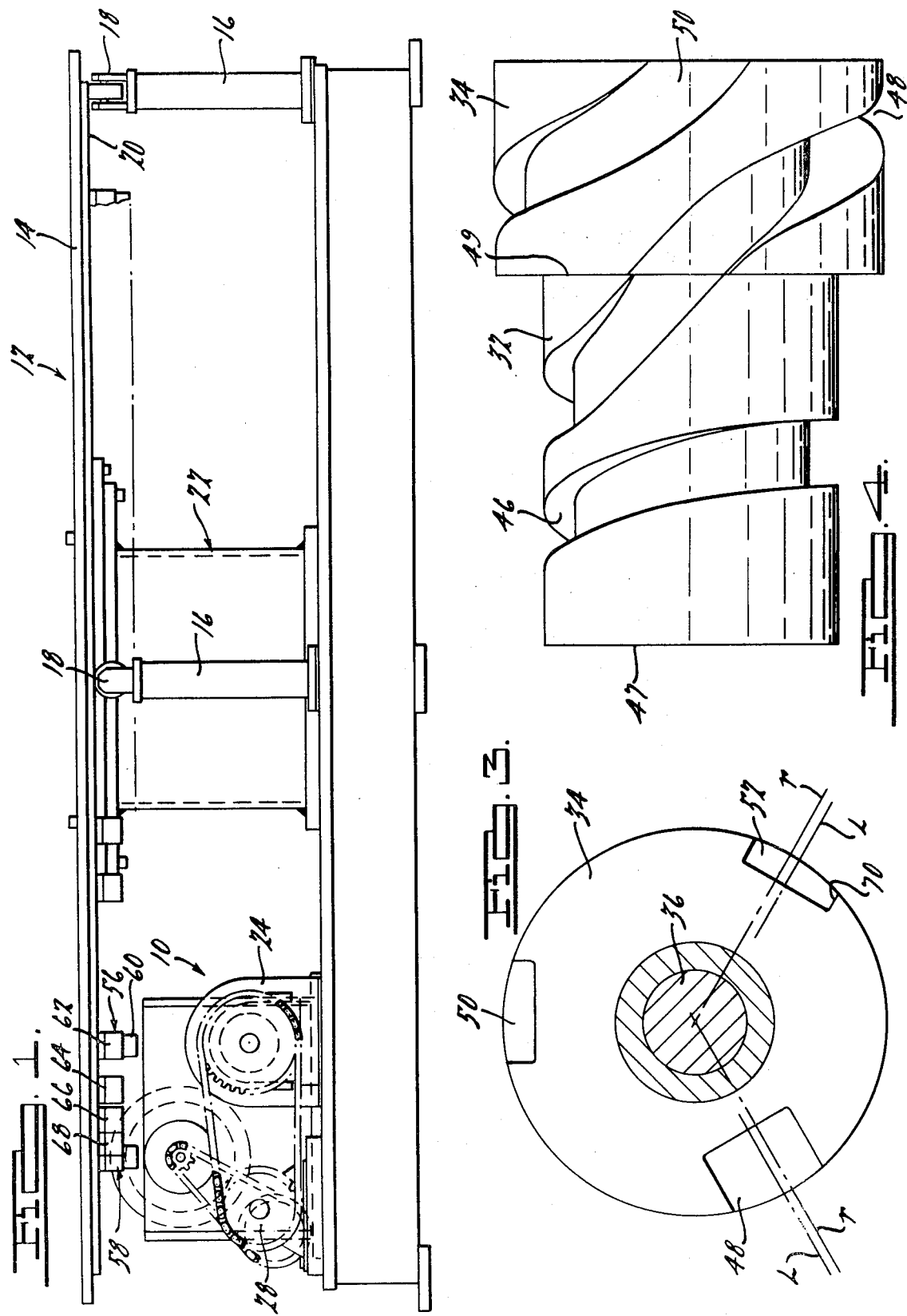

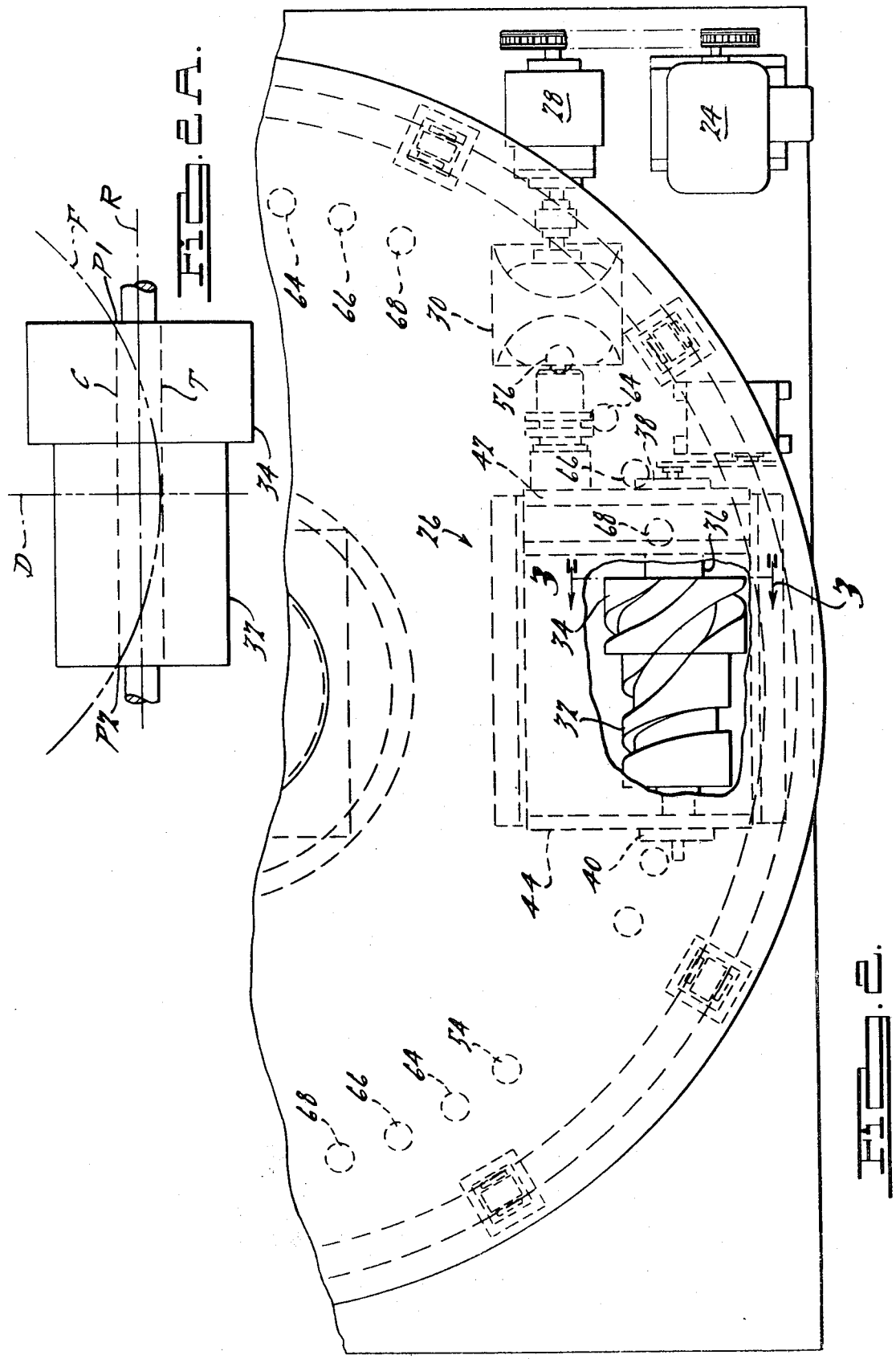

TWIN CAM INDEX DRIVE

BACKGROUND AND SUMMARY OF THE INVENTION

The present invention relates generally to drive means for work transfer apparatus and more particularly to improved dual cam drives for effecting cyclical advancement of work transfer apparatus between successive work stations.

Multiple cam drive assemblies have long been in use in conjunction with various types of work transfer apparatus including linear, rotary and reciprocating type apparatus. However, in both the linear and rotary types of drive arrangements it has been necessary to position the two cams on separate shafts positioned in side-by-side substantially parallel relationship with respective cam followers positioned on the work supporting transfer in laterally or radially offset spaced relationship. While these drives perform satisfactorily, this dual shaft side-by-side cam arrangement makes them more expensive to construct because timing means must be provided to insure proper rotation of each of the respective cams with respect to the other as well as the need for multiple bearings and shafts. The presence of such timing means not only increases the cost of manufacturing the associated drive means but also increases the cost of maintenance as well as the potential downtime due to the presence of additional operating apparatus. Further, because precise timing of the two cams is critical for operation thereof, additional time will be required by maintenance personnel to reset and verify proper timing subsequent to any maintenance or repair requiring dismantling thereof. Therefore, in order to eliminate the need for this additional timing mechanism and reduce the attendant maintenance time and costs, it is desirable to locate both cams on a single shaft and to align the cam followers accordingly.

Multiple cams on a single shaft have been previously utilized although such use has been restricted to reciprocating drive apparatus wherein dual primary cams are provided on opposite ends of the reciprocating work supporting apparatus. Secondary cam followers can then be provided therebetween which will engage only a center secondary cam. However, because the primary cam followers never enter the area occupied by the secondary cam there has not been any need to be concerned with possible interference between the primary and secondary cam followers and the primary and secondary cams. It is generally not practical to utilize a single cam as the cam must include provisions for both acceleration/deceleration of the work transfer apparatus as well as a constant velocity movement thereof. While for very short stroke reciprocating or linear transfer operations it may be possible to omit the constant velocity portion and thereby employ only a single cam having acceleration/deceleration portions, this would be totally impractical for the transfer distances generally required in commercial applications because the barrel cam would become excessively long thereby substantially increasing the cost of the apparatus.

The present invention, however, overcomes these disadvantages in providing primary and secondary cams rotatably supported on a common shaft thereby totally eliminating the need for additional and potential complex timing gear means or the like and without unnecessarily increasing the required length of the cams. The primary and secondary cams may be fabricated as a single integral unit although it is believed preferable to separately fabricate same for both cost and ease of replacement. The elimination of timing means not only substantially reduces the complexity of the overall drive system but offers improved reliability due to the reduced number of operating parts. Additionally, significant reduction in downtime may be realized by use of the subject drive system as not only is the amount of apparatus requiring maintenance and/or repair reduced, but there is no need for resetting of such potentially complex timing means as was heretofore required. Thus, the subject invention provides an improved drive system which is well suited for use in rotational, linear and reciprocating indexing of work transfer apparatus.

Additional advantages and features of the present invention will become apparent from the subsequent description and the appended claims taken in conjunction with the accompanying drawings.

BRIEF DESCRIPTION OF THE DRAWINGS

FIG. 1 is a side view of a multi-station dial table incorporating an index drive assembly in accordance with the present invention;

FIG. 2 is a plan view of the dial table of FIG. 1 with portions thereof broken away;

FIG. 2a is an enlarged fragmentary schematic view of the rotary cam of the present invention showing the positioning thereof relative to the circular path traveled by the cam followers;

FIG. 3 is a section view of the rotary cam forming a part of the drive assembly of the present invention, the section being taken along line 3—3 of FIG. 2;

FIG. 4 is a plan view of the rotary cam utilized in the drive assembly of the present invention.

DESCRIPTION OF THE PREFERRED EMBODIMENTS

Figure 5:
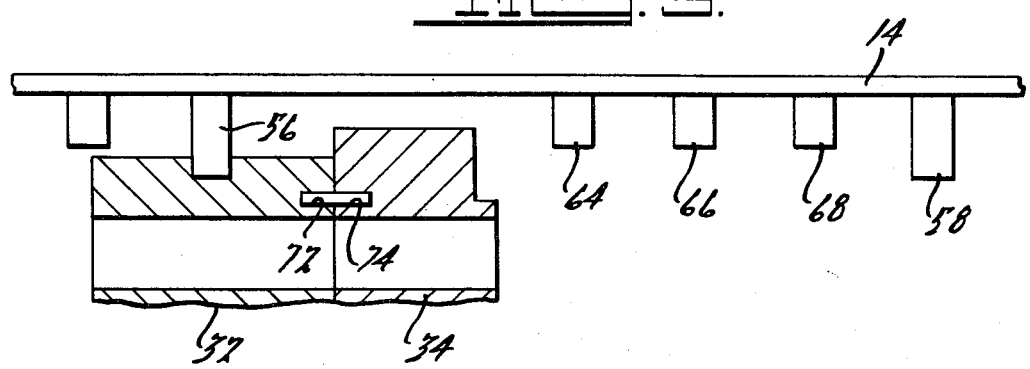
FIGS. 5 through 8 are schematic views showing the associated rotary cam in section with the cam followers shown in various sequential operational positions with respect thereto, all in accordance with the present invention.
Figure 6:
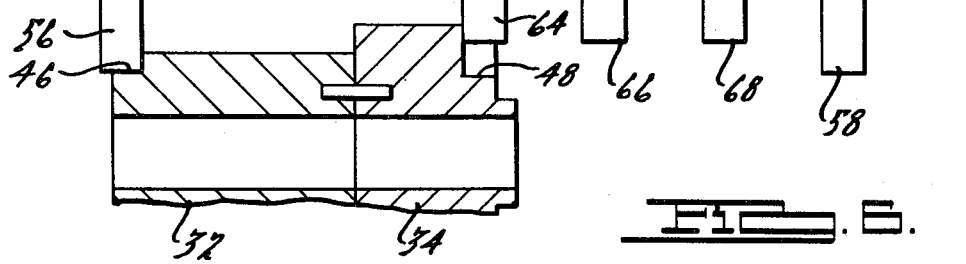

Referring now to the drawings, there is shown an indexing drive assembly shown in operative driving relationship to a multi-station dial table 12.

As best seen with reference to FIG. 1, dial table 12 includes a rotatable work supporting table 14 with a plurality of upstanding posts 16 positioned in circumferentially spaced relationship around its periphery. Each of the posts 16 is provided with roller means 18 engaging the lower surface 20 of the rotatable table. A suitably bearinged center support assembly 22 is also provided. Because such rotatable work transfer apparatus is well known in the art, further description thereof is not believed necessary.

Drive assembly 10 will preferably be positioned adjacent the outer periphery of dial table 12 and includes a drive means such as an electric motor 24 drivingly connected to a rotatable cam assembly 26 via brake means 28 and gear reduction means 30.

Cam assembly 26 includes primary and secondary cam members 32 and 34 rotatably supported upon a common drive shaft 36 and positioned in abutting relationship with each other. Drive shaft 36 in turn is supported by suitable bearing means 38 and 40 within end walls 42, 44 of a housing surrounding the rotatable cam members.

Primary and secondary rotatable cams or barrel cams 32 and 34 are generally cylindrical in shape each having suitably formed helical cam grooves extending around the periphery thereof. Primary cam 32 has a single helical cam groove 46 provided on the surface thereof. The pitch of cam groove 46 varies over the axial length of primary cam 32 generally symmetrically outwardly from the longitudinal center thereof. The pitch of cam groove 46 is substantially zero at the longitudinal center of primary cam 32 so as to provide a period of dwell and has an increasing pitch as the groove progresses toward each of the opposite ends 47 and 49 thereof so as to provide acceleration/deceleration portions on opposite sides of the dwell portion.

Secondary cam 34 has a diameter greater than primary cam 32 and as shown includes three helical cam grooves 48, 50, and 52 on the periphery thereof each of which has a constant pitch over the axial length thereof and a transverse width greater than that of groove 46. As shown in FIG. 3, cam groove 48 is substantially deeper than either of the other two cam grooves 50 and 52 provided on secondary cam 34 and is positioned in circumferentially aligned relationship with cam groove 46 provided on primary cam 32. While it would be possible to provide only a single cam groove such as groove 48 on secondary cam 34, the provision of additional grooves enables the axial length thereof and hence the cost of fabrication to be reduced.

A plurality of primary cam followers 54, 56, 58 are secured to the undersurface 20 of dial table 14 and depend therefrom a distance sufficient to enable engagement thereof with the cam grooves 46 and 48 provided in both primary and secondary cams 32 and 34. The actual number of primary cam followers will be dependent upon and equal to the number of work stations desired to be provided around dial table 12 and they will preferably be substantially equally circumferentially spaced around the dial table 12. As shown in FIG. 1, each of the primary cam followers 54, 56, 58 is substantially identical being generally cylindrical in shape and having a lower portion 60 of a diameter less than the upper portion 62.

A plurality of substantially identical secondary cam followers 64, 66, 68 are also provided secured to and depending from the undersurface 20 of dial table 12. As best seen with reference to FIGS. 2 and 5, secondary cam followers will be positioned radially outwardly from the axis of rotation of dial table 12 a distance substantially equal to the radial distance of primary cam followers 48, 50, 52 and therefore in circumferential alignment therewith. Also, secondary cam followers 64, 66, 68 will be substantially equally spaced from each other a distance substantially equal to or slightly less than the axial length of secondary cam 34. Additionally, the secondary cam followers will be grouped more closely to one of the primary cam followers than the other, the closest primary cam follower 58 being positioned a distance substantially equal to the spacing between the secondary cam followers 64, 66, 68 and the more distant primary cam follower 56 being spaced a distance substantially equal to or slightly less than the axial length of both the primary and secondary cams 32 and 34. It is important to select the relative spacing of primary and secondary cam followers 48, 50, 52 and 64, 66, 68 with respect to the lengths of the cams 32 and 34 such that at least one cam follower will be engaged by either cam 32 or 34 so as to maintain continuous positive control of dial table 12. The actual number of secondary cams 64, 66, 68 required will be dependent upon both the angular distance the dial table 12 must be advanced for each indexing cycle and the length of each of the primary and secondary cams 32 and 34.

Additionally, as best seen with reference to FIG. 2a, the axis of rotation R of primary and secondary cams is positioned parallel to and approximately midway between a chord C of the circular path F traced by the cam followers and extending between the points $P_1$ and $P_2$ at which the center of a primary cam follower enter and exit the respective grooves on the secondary and primary cams and a line T extending tangent to the circular path traced by the centers of the respective cam followers. It should be noted that FIG. 2a has been exaggerated for purposes of illustration. Because in this embodiment the cam followers move along a circular path F, the longitudinal axis L (as shown in FIG. 3) of the groove will not necessarily lie along a radius r of the cylindrical cam but rather will be parallel to and at most locations along the length of the cam groove be radially offset therefrom. This above mentioned preferred positioning of the axis of rotation of the primary and secondary cams 32 and 34 operates to minimize this radial offset. Because the effect of an increased offset is to reduce the actual height of the wall 70 of the cam groove positioned outwardly in the direction of offset, it is important to minimize this radial offset as discussed above. Similarly for the same reason it is preferale to position the longitudinal center of the cam on a radius D of the dial table extending substantially perpendicular to the axis of rotation of the primary and secondary cams. In addition to increasing the minimum cam groove wall height, this positioning also affords an ample wall height for the cam groove in the area of the transition between the dwell portion and acceleration/deceleration portions of the cam groove. This is desirable as peak loading may be encountered at this transition area in order to overcome the static inertia of the dial table and associated workpieces.

The operation of the above described drive assembly may best be understood with reference to FIGS. 5-8 which illustrate in schematic form the operational sequence.

As shown in FIG. 5, primary cam follower 56 is shown in a dwell portion of the cam groove 46 provided in the primary cam 32. Upon energization of the drive motor 24, the primary and secondary cams 32 and 34 will begin to rotate effecting a relative advancement of the primary can through the balance of the dwell portion of the cam groove 46 and into the acceleration portion thereof. As previously indicated, this acceleration portion comprises an increasing pitch helical cam groove whereas the dwell portion comprises a zero pitch cam groove portion.

As the primary cam follower 56 reaches the left hand end (as shown) of the primary cam 32, the pitch of this cam groove has increased to the point where it provides a velocity identical to the constant pitch helical cam grooves 48, 50, 52 provided on the velocity provided by secondary cam 34. Thus, as the primary cam follower 56 exits to the left of the primary cam 32, the leading secondary cam 64 will enter one of the cam grooves 48 provided on the secondary cam 34. As previously mentioned, it is important to select the lengths of the respective cams and/or the positioning of the respective primary and secondary cam followers so that there is a slight overlap between the point at which one follower exists a cam groove and a following cam follower enters a cam groove so as to assure positive control of the dial table at all times.

Figure 7:
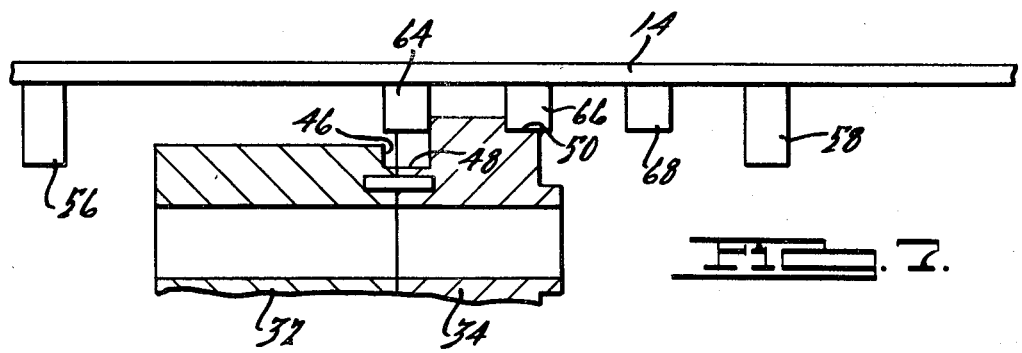
Figure 8:
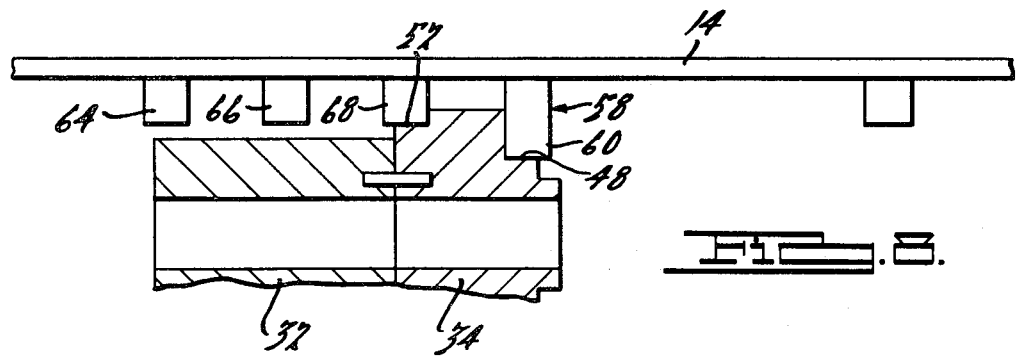

As the secondary cam 34 continues to rotate, the dial table 12 will be advanced in rotation by the action of secondary cam follower 64 traversing through the cam groove 48. As cam follower 64 approaches and exits the end of the secondary cam 34, the next successive secondary cam follower 66 will approach and enter the next following cam groove 50 so as to continue advancement of the dial table 12 at substantially constant velocity. This process will be repeated for successive ones of the secondary cam followers until all have traversed through secondary cam 34. As shown in FIGS. 7 and 8, the secondary cam followers 64, 66, and 68 are of a length relative to the reduced diameter primary cam 32 so as to pass over this primary cam without engaging the cam groove 46 provided therein.

As previously mentioned, at least one of the secondary cam grooves 48 has a substantially greater depth than the others. Thus, as the last secondary cam follower 68 approaches the end of and exits the end of the secondary cam 34, a following primary cam follower 58 will approach and enter secondary cam groove 48 and traverse therethrough. However, as primary cam follower 58 approaches the end of and exits the secondary cam 34, the lower portion 60 thereof will move smoothly into the cam groove 46 provided on the primary cam 32. Because the initial pitch of helical cam groove 46 is identical to that of the constant velocity cam groove 48 at the same radius and the two cam grooves 46 and 48 are accurately aligned, there will be no change in velocity or other interruption in the movement of the dial table 12. However, the pitch of this primary cam groove decreases as the follower moves toward the longitudinal center of the primary cam 32 thus decelerating and eventually stopping the dial table 12 as the primary follower moves into the dwell portion of the primary cam groove 46.

At this point, no further movement of the dial table will occur and the motor may be de-energized or otherwise disengaged such as by a suitable clutch if desired, and brake means actuated to stop further rotation of the cams.

As previously mentioned, primary and secondary cams 32 and 34 will preferably be separately fabricated so as to allow replacement of only one section if required as well as to facilitate fabrication thereof. In order to further prevent relative rotation therebetween as well as to facilitate assembly of cams 32 and 34 with cam grooves 46 and 48 accurately aligned, a plurality of relatively small bores 72 and 74 are provided extending axially inwardly from abutting ends of respective cams 32 and 34. Suitable dowel pins 76 may then be inserted in bores 72 and 74 thereby insuring precise accurate alignment of grooves 46 and 48.

It should be noted that in order to minimize the radial offset of the cam grooves 46, 48, 50, 52 as discussed above, it will be preferable to keep the axial length of both the primary and secondary cams 32 and 34 as short as possible. Therefore, it will not generally be practical to provide more than a single primary cam groove 46 on the primary cam and maintain the required wall thickness required to withstand the loads encountered so as to provide a reliable drive system. Accordingly, it is necessary to provide gear reduction means the ratio of which is selected with respect to the required angular displacement such that an integer number of revolutions of the primary and secondary cams 32 and 34 will be utilized to effect a transfer between respective work stations. Also, given the above constraints, it will only be necessary to machine one secondary cam groove 48 to a greater depth than the others. Additional cam grooves 50 and 52 are preferably provided on the secondary cam follower in order to reduce the axial length thereof without encountering the problems associated with providing multiple primary cam grooves because the secondary cam grooves all have a constant pitch.

As may now be appreciated, the present invention provides an improved drive system which offers a simplified assembly offering excellent reliability and low downtime by eliminating the additional drive and/or timing means required in prior dial or other transfer drive systems. Further, service and maintenance operations may be more easily, rapidly and accurately performed as there is no need to effect precise timing of the two cams as they are now secured together on a common shaft.

It should be noted that while the above drive system has been described with application to effecting rotary motion of a dial table, it may also conveniently and easily be employed in conjunction with linear work transfer apparatus and/or reciprocating apparatus.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

We claim:

1. An index drive apparatus comprising:
movable work supporting means having a work supporting surface associated therewith;
a plurality of primary cam followers secured in spaced relationship to said movable work supporting means;
a plurality of secondary cam followers secured to said work supporting means in spaced relationship and in alignment with said primary cam follower means;
cam means having a primary cam portion and a secondary cam portion; and
means for driving said cam means whereby successive ones of said primary cam followers engage said primary and secondary cam portions and successive ones of said secondary cam followers engage only said secondary cam portion to index said movable work supporting means between successive work stations.

2. An index drive apparatus as set forth in claim 1 wherein said cam means comprise rotatable barrel cam means.

3. An index drive apparatus as set forth in claim 2 wherein said primary cam portion is provided on a primary barrel cam and said secondary cam portion is provided on a secondary barrel cam, said primary and secondary barrel cams being rotatably supported in coaxial relationship.

4. An index drive apparatus as set forth in claim 3 wherein said primary and secondary cams are rotatably supported on a common shaft.

5. An index drive apparatus as set forth in claim 2 wherein said primary cam portion has a diameter less than said secondary cam portion.

6. An index drive apparatus as set forth in claim 5 wherein said primary cam followers have a length greater than the length of said secondary cam followers.

7. An index drive apparatus as set forth in claim 1 wherein said cam means is cylindrical in shape and said secondary cam portion has a plurality of circumferentially spaced secondary helical cam grooves provided thereon, at least one of said secondary cam grooves having a depth greater than the others, said secondary helical cam grooves having a constant pitch.

8. An index drive apparatus as set forth in claim 7 wherein said primary cam portion has at least one primary helical cam groove provided thereon, said primary helical cam groove having one end circumferentially aligned with said at least one of said secondary helical cam groove.

9. An index drive apparatus as set forth in claim 8 wherein said primary cam portion has a radius less than said secondary cam portion and the depth of said at least one of said secondary cam grooves is greater than the difference in radius between said primary and secondary cam portions.

10. An index drive apparatus as set forth in claim 9 wherein said secondary cam followers have a length less than the length of said primary cam followers so that said secondary cam followers may pass over said primary cam portion without engagement therewith.

11. An index drive apparatus as set forth in claim 10 wherein said cam means comprise a primary barrel cam and a secondary barrel cam rotatably supported on a common shaft.

12. An indexing drive apparatus for driving work transfer means intermittingly between a plurality of work stations comprising:
a predetermined number of first cam followers secured to said work transfer means, said predetermined number being equal to the number of said work stations;
a plurality of second cam followers secured to said work transfer means and positioned in spaced relationship along a line traversed by said first cam followers and intermediate successive ones thereof; drive means;
rotary cam means driven by said drive means including a first portion engageable with successive ones of said first cam followers and a second portion engageable with successive ones of said first and second cam followers to drive said work transfer means.

13. A drive means for a multi-station circular work transfer apparatus including a rotatable work supporting means, said drive means comprising:
cylindrical rotatable cam means including coaxial primary and secondary cam portions, said secondary cam portion having a diameter greater than said primary cam portion;
power means for rotatably driving said rotatable cam means;
a predetermined number of primary cam followers secured in circumferentially spaced relationship to said rotatable work supporting means, said predetermined number being equal to the number of said work stations;
a plurality of secondary cam followers secured to said rotatable work supporting means in circumferentially spaced relationship intermediate said primary cam followers and in circumferential alignment therewith, said secondary cam followers having a length less than said primary cam followers,
said primary cam portion engaging a selective one of said primary cam followers to initially drive said rotatable work supporting means and a following one of said secondary cam followers engaging said secondary cam portion to continue driving said rotatable work supporting means as said primary cam follower moves out of engagement with said cam means.

14. A drive means as set forth in claim 13 wherein said secondary cam followers travel over said primary cam portion without engagement therewith.

15. A drive means as set forth in claim 13 wherein a next following one of said primary cam followers moves into engagement with said cam means as a preceding one of said secondary cam followers moves out of engagement with said secondary cam portion, said primary cam follower cooperating with said primary cam portion to brake said rotatable work supporting means to a stop.

16. A drive means as set forth in claim 13 wherein the axis of rotation of said rotatable cam means is positioned substantially midway between a chord interconnecting the circumferentially spaced points of entry and exit of said primary cam followers from said cam means and a line extending substantially parallel to said chord and tangent to the circular path traveled by said primary and secondary cam followers, said axis of rotation extending substantially parallel to said chord.

17. A drive means as set forth in claim 13 wherein said secondary cam followers are substantially equally spaced from each other a distance substantially equal to or slightly less than the axial length of said secondary cam portion.

18. A drive means as set forth in claim 13 wherein the distance between each of said primary cam followers and an adjacent one of said secondary cam followers is substantially equal to or slightly less than the axial length of said cam means.

19. A drive means as set forth in claim 13 wherein said secondary cam portion has a plurality of substantially equally spaced helical secondary cam grooves provided thereon of constant pitch, successive of said secondary cam grooves being engageable with successive ones of said secondary cam followers so as to enable the axial length of said secondary cam portion to be a minimal length.

20. A drive means as set forth in claim 19 wherein one of said secondary cam grooves has a depth sufficient to allow said primary cam follower to pass therethrough, the number of revolutions required to advance said rotatable work supporting means between stations being selected so as to position said one of said secondary cam grooves so as to receive said primary cam follower.

21. A drive means as set forth in claim 20 wherein said primary cam followers are cylindrical in shape and the portion thereof engageable with said primary cam portion has a diameter less than the diameter of a portion engageable with said secondary cam portion.

* * * * *